United States Patent
Li (10) Patent No.: US 7,466,384 B2
(45) Date of Patent: Dec. 16, 2008

(54) LIQUID CRYSTAL DISPLAY PANEL AND METHOD FOR FABRICATING COLOR FILTER SUBSTRATE

(75) Inventor: Yu-Zhi Li, Jiaosi Township, Yilan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 452 days.

(21) Appl. No.: 11/270,875

(22) Filed: Nov. 8, 2005

(65) Prior Publication Data

US 2007/0103629 A1    May 10, 2007

(51) Int. Cl.
*G02F 1/1337* (2006.01)

(52) U.S. Cl. .................. 349/129; 349/106; 349/107; 349/108

(58) Field of Classification Search .................. 349/129
See application file for complete search history.

(56) References Cited

U.S. PATENT DOCUMENTS

| 6,424,398 | B1 | 7/2002 | Taniguchi | 349/143 |
| 6,515,727 | B2 * | 2/2003 | Yoon et al. | 349/143 |
| 6,836,308 | B2 | 12/2004 | Sawasaki et al. | 349/129 |
| 2004/0183084 | A1 | 9/2004 | Wachi | 257/98 |
| 2005/0024567 | A1 | 2/2005 | Sawasaki et al. | 349/123 |

FOREIGN PATENT DOCUMENTS

| EP | 1103840 | 5/2001 |
| EP | 1484633 | 12/2004 |

* cited by examiner

*Primary Examiner*—David C. Nelms
*Assistant Examiner*—Phu Vu
(74) *Attorney, Agent, or Firm*—J.C. Patents (57) ABSTRACT

A liquid crystal display panel comprising a first substrate, a second substrate, and a liquid crystal layer is provided. A plurality of first pixel regions, second pixel regions and third pixel regions are defined on the second substrate. A first alignment protrusion structure is disposed in the first pixel regions, a second alignment protrusion structure is disposed in the second pixel regions, and a third alignment protrusion structure is disposed in the third pixel regions. Wherein, the heights of the first, second and third alignment protrusion structures are different. The liquid crystal layer is disposed between the first substrate and the second substrate.

18 Claims, 9 Drawing Sheets

LIQUID CRYSTAL DISPLAY PANEL AND METHOD FOR FABRICATING COLOR FILTER SUBSTRATE

BACKGROUND OF THE INVENTION

1. Field of the Invention

The present invention generally relates to a liquid crystal display panel and a method of fabricating a color filter substrate. More particularly, the present invention relates to a liquid crystal display panel employing the multi-domain vertical alignment (MVA) technique and a method of fabricating a color filter substrate.

2. Description of Related Art

With big leaps in the techniques of manufacturing semiconductor devices and opto-electronics devices, high picture quality, slim, low power consumption and radiation-free displays such as the liquid crystal displays (LCD) have gradually become mainstream display products. In addition, in order to achieve the purpose of wide view angle, some displays, such as twisted-nematic (TN) LCD complying with wide viewing film, in-plane switching (IPS) LCD, fringe field switching LCD, and multi-domain vertical alignment (MVA) LCD, are developed to perform the purpose.

Figure 1:
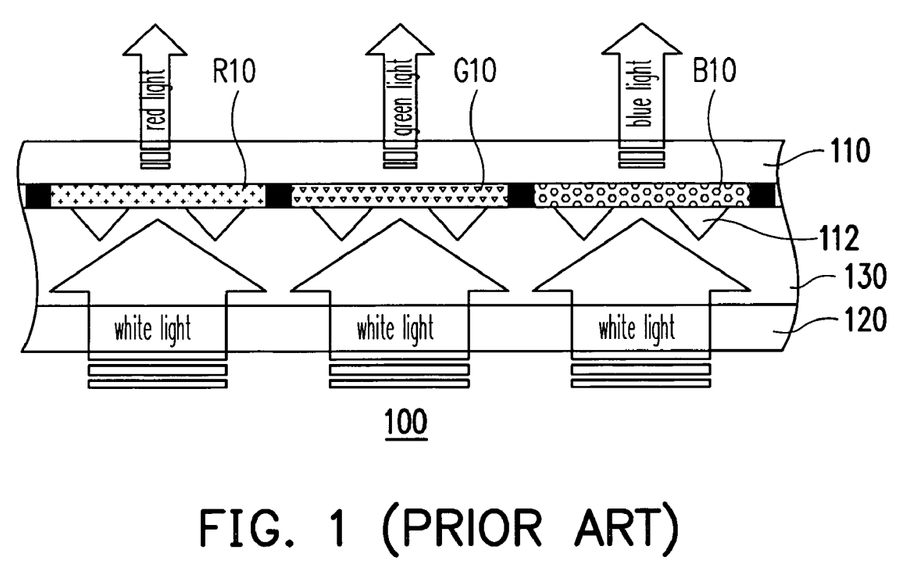
FIG. 1 is a cross-sectional view schematically illustrating a conventional MVA LCD panel.

FIG. 1 is a cross-sectional view schematically illustrating a conventional MVA LCD panel. Referring to FIG. 1, the conventional MVA LCD panel 100 comprises a color filter substrate 110, a thin film transistor (TFT) array substrate 120, and a liquid crystal layer 130. Wherein, the color filter substrate 110 has a plurality of color filtering patterns R10, G10, B10, and an alignment protrusion structure 112. The alignment protrusion structure 112 modifies the direction of electric field nearby, and causes liquid crystal molecules in the liquid crystal layer 130 arranged in multi-domain.

In the prior art, the alignment protrusion structure 112 has a stationary height whether in the red, green, or blue subpixel. Moreover, the liquid crystal molecules tilting by an effect of the alignment protrusion structure 112 have different transmittances to the lights with different wavelengths, and thus cause brightness imbalance between the red, green, and blue lights.

Figure 2:
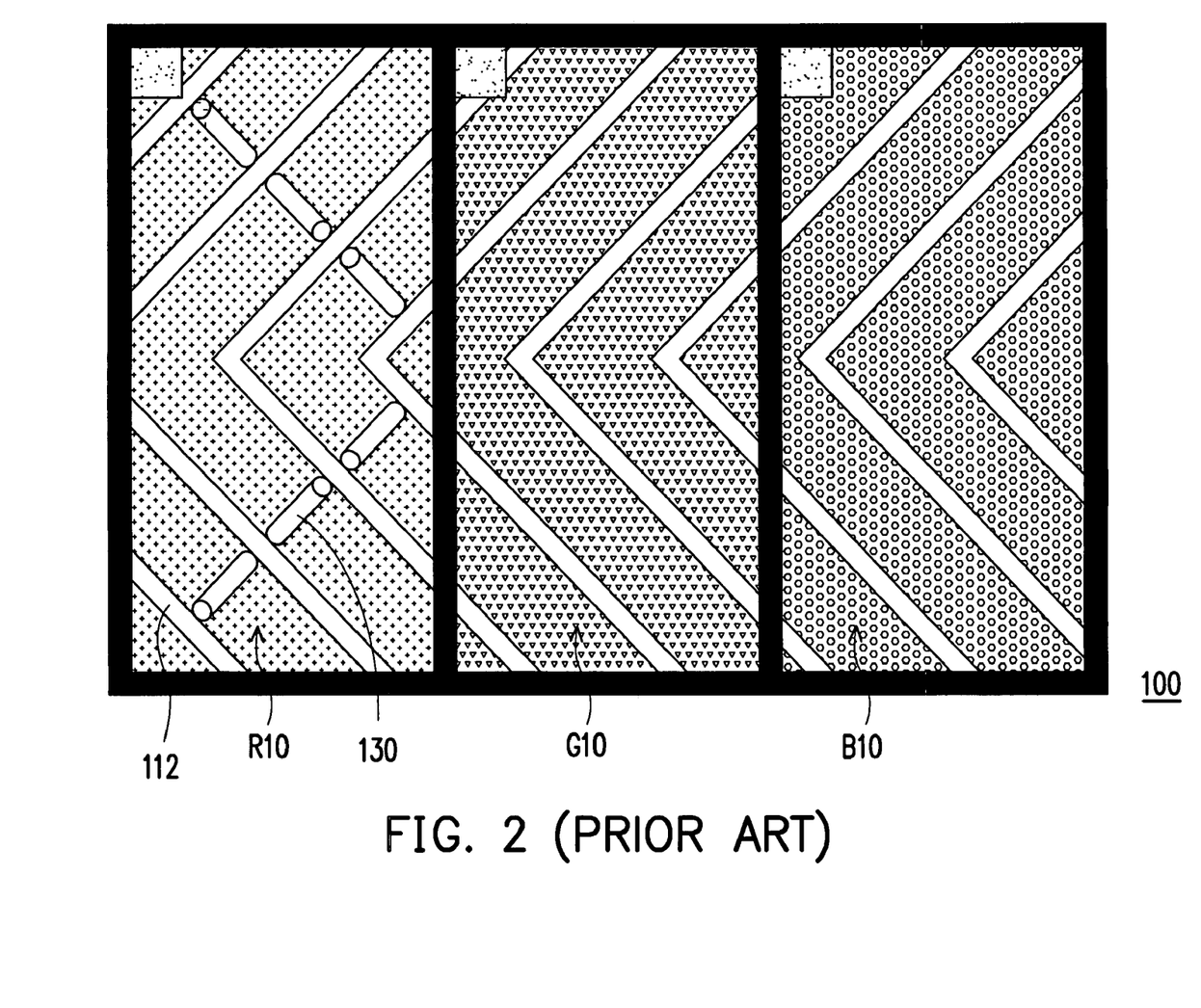
FIG. 2 is a top view of a pixel of the LCD panel 100 shown in FIG. 1.

Referring to FIG. 2, which is a top view of a pixel of the LCD panel 100 shown in FIG. 1. The pixel of the LCD panel 100 can be divided into three sub-pixels according to the positions of the color filtering patterns R10, G10, and B10. Wherein, by the conventional alignment protrusion structure 112, the liquid crystal molecules of the liquid crystal layer 130 are arranged along only four different tilting directions and have the same tilting angle due to the stationary height of the alignment protrusion structure 112. Accordingly, a problem of gamma shift occurs as observing the LCD panel 100 in different vision angles. The above problems of gamma shift and brightness imbalance between different color lights will result in an abnormal display of the LCD panel 100.

SUMMARY OF THE INVENTION

Accordingly, the present invention is directed to a LCD panel, which has superior color uniformity and can reduce the problem of gamma shift.

The present invention is also directed to a method for fabricating a color filter substrate to improve color uniformity of the LCD panel and reduce the problem of gamma shift.

The present invention provides a liquid crystal display panel, which comprises a first substrate, a second substrate, and a liquid crystal layer. A plurality of first pixel regions, a plurality of second pixel regions, and a plurality of third pixel regions are defined on the second substrate. A first alignment protrusion structure is disposed in the first pixel regions, a second alignment protrusion structure is disposed in the second pixel regions, and a third alignment protrusion structure is disposed in the third pixel regions. The first alignment protrusion structure, the second alignment protrusion structure and the third alignment protrusion structure have different heights. The liquid crystal layer is disposed between the first substrate and the second substrate.

In an embodiment of the liquid crystal display panel, the height of the first alignment protrusion structure in each first pixel region is various as well as the second alignment protrusion structure in each second pixel region and the third alignment protrusion structure in each third pixel region.

In an embodiment of the liquid crystal display panel, the materials of the first alignment protrusion structure, the second alignment protrusion structure and the third alignment protrusion structure are selected from the group consisting of a color filtering material and a transparent photo-sensitive material.

In an embodiment of the liquid crystal display panel, a first color filtering pattern is disposed in the first pixel regions and the first alignment protrusion structure is disposed on the first color filtering pattern, a second color filtering pattern is disposed in the second pixel regions and the second alignment protrusion structure is disposed on the second color filtering pattern, and a third color filtering pattern is disposed in the third pixel regions and the third alignment protrusion structure is disposed on the third color filtering pattern. For example, the first alignment protrusion structure may consist of a protrusion pattern, the second alignment protrusion structure may consist of a lower layer filtering pattern and a first upper layer protrusion pattern, and the third alignment protrusion structure may consist of a double layer filtering pattern and a second upper layer protrusion pattern.

In an embodiment of the liquid crystal display panel, a first color filtering pattern is disposed in the first pixel regions, a second color filtering pattern is disposed in the second pixel regions, and a third color filtering pattern is disposed in the third pixel regions. The first alignment protrusion structure consists of a protrusion pattern disposed on the first color filtering pattern, the second alignment protrusion structure consists of a lower layer filtering pattern disposed under the second color filtering pattern and a first upper layer protrusion pattern disposed on the second color filtering pattern. Besides, the third alignment protrusion structure consists of a double layer filtering pattern disposed under the third color filtering pattern and a second upper layer protrusion pattern disposed on the third color filtering pattern.

In an embodiment of the liquid crystal display panel, there may further be a plurality of spacers disposed between the first substrate and the second substrate.

In an embodiment of the liquid crystal display panel, the first substrate is a thin film transistor array substrate.

The present invention provides another liquid crystal display panel, which comprises a first substrate, a second substrate, and a liquid crystal layer. The second substrate is disposed above the first substrate, wherein a plurality of pixel regions is defined on the second substrate. An alignment protrusion structure is disposed in the pixel regions, and the height of the alignment protrusion structure in each first pixel region is various The liquid crystal layer is disposed between the first substrate and the second substrate.

In an embodiment of the liquid crystal display panel, the materials of the alignment protrusion structure are selected from the group consisting of a color filtering material and a transparent photo-sensitive material.

In an embodiment of the liquid crystal display panel, there may further be a plurality of spacers disposed between the first substrate and the second substrate.

In an embodiment of the liquid crystal display panel, the first substrate is a thin film transistor array substrate.

The present invention provides a method for fabricating a color filter substrate. First, a substrate having a plurality of first pixel regions, a plurality of second pixel regions, and a plurality of third pixel regions is provided. Then, a first color filtering pattern in each first pixel region, a second color filtering pattern in each second pixel region, and a third color filtering pattern in each third pixel region are formed respectively. Next, a first alignment protrusion pattern is formed on the first color filtering pattern in each first pixel region. A second alignment protrusion pattern is formed on the second color filtering pattern in each second pixel region. A third alignment protrusion pattern is formed on the third color filtering pattern in each third pixel region. The first alignment protrusion structure, the second alignment protrusion structure and the third alignment protrusion structure have different heights.

In an embodiment of the fabricating method, the materials of the first alignment protrusion structure, the second alignment protrusion structure and the third alignment protrusion structure are selected from the group consisting of a color filtering material and a transparent photo-sensitive material.

In an embodiment of the fabricating method, the method for forming the first alignment protrusion structure, the second alignment protrusion structure and the third alignment protrusion structure comprises forming a first filtering pattern on the third color filtering pattern in each third pixel region while forming the second color filtering pattern in each second pixel; forming a lower layer filtering pattern on the second color filtering pattern in each second pixel region and forming a second filtering pattern on the first filtering pattern on the third color filtering pattern while forming the first color filtering pattern in each first pixel region; and forming a protrusion pattern on each first color filtering pattern, on the lower filtering pattern, and on the second filtering pattern. In addition, the fabricating method further forms a patterned light shielding layer before forming the first color filtering pattern, the second color filtering pattern, and the third color filtering pattern.

The present invention provides another method for fabricating a color filter substrate. First, a substrate having a plurality of first pixel regions, a plurality of second pixel regions, and a plurality of third pixel regions is provided. Then, a first color filtering pattern is formed in each first pixel region, a second color filtering pattern is formed in each second pixel region, and a third color filtering pattern is formed in each third pixel region respectively. Next, a protrusion pattern is formed on the first color filtering pattern in each first pixel region. A lower layer filtering pattern is formed under the second color filtering pattern and a first upper layer protrusion pattern is formed on the second color filtering pattern in each second pixel region. And, a double layer filtering pattern is formed under the third color filtering pattern and a second upper layer protrusion pattern is formed on the third color filtering pattern in each third pixel region.

In an embodiment of the fabricating method, the materials of the protrusion pattern formed on the first color filtering pattern, the first upper layer protrusion pattern formed on the second color filtering pattern, and the second upper layer protrusion pattern the third color filtering pattern comprise a transparent photo-sensitive material.

In an embodiment of the fabricating method, the lower layer filtering pattern is formed in each second pixel region and a first filtering pattern is formed in each third pixel region while forming the first color filtering pattern in each first pixel region.

In an embodiment of the fabricating method, a second filtering pattern is formed on the first filtering pattern to constitute the double layer filtering pattern with the first filtering pattern in each third pixel region while forming the second color filtering pattern in each second pixel region.

Accordingly, the LCD panel and the method for fabricating the color filter substrate of the present invention provide a alignment protrusion structure having multiple heights for improving the color uniformity of the LCD panel and eliminating the problem of gamma shift.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
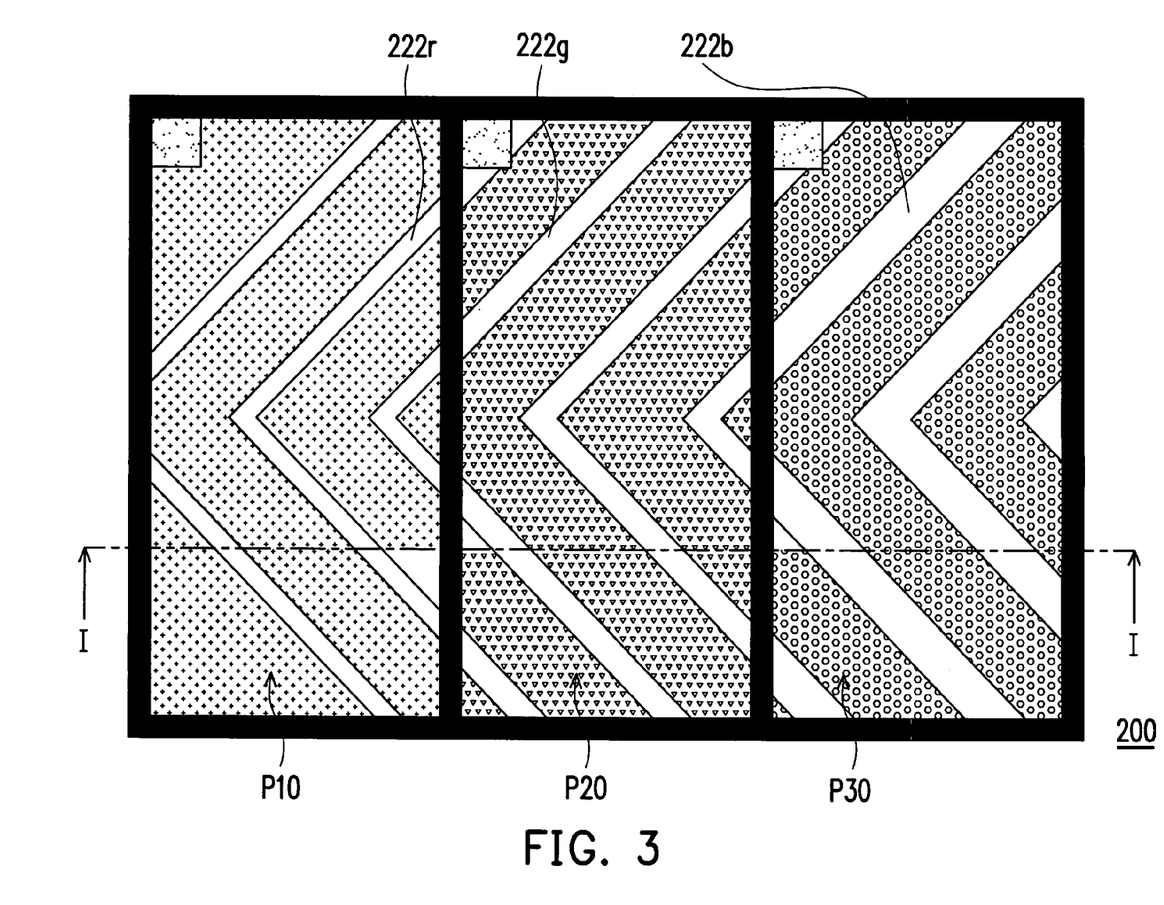
FIG. 3 is a top view schematically illustrating a pixel of a LCD panel according to an embodiment of the present invention.
Figure 4:
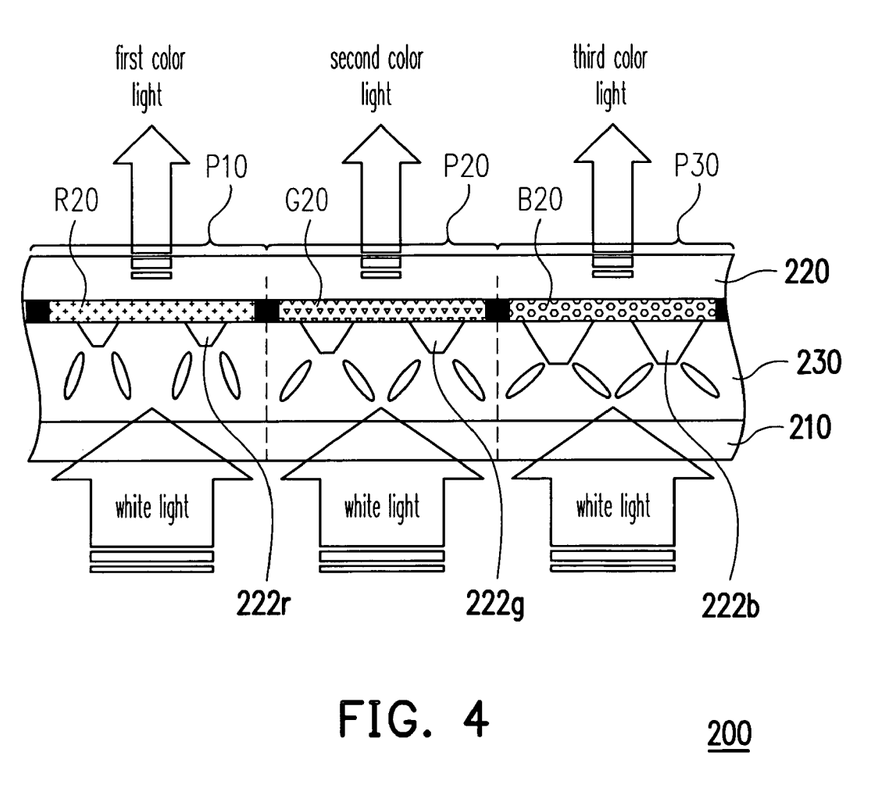
FIG. 4 is a schematic cross-sectional view along line A-A' in FIG. 3.

FIG. 3 is a top view schematically illustrating a pixel of a LCD panel according to an embodiment of the present invention. FIG. 4 is a schematic cross-sectional view along line A-A' in FIG. 3. Referring to FIG. 3 and FIG. 4, the LCD panel 200 of the present invention mainly comprises a first substrate 210, a second substrate 220, and a liquid crystal layer 230. The liquid crystal layer 230 is disposed between the first substrate 210 and the second substrate 220. The second substrate 220 has a plurality of first pixel regions P10, second pixel regions P20 and third pixel regions P30 defined thereon, and FIG. 3 and FIG. 4 show only a first pixel region P10, a second pixel region P20 and a third pixel region P30. In addition, a first alignment protrusion structure 222$r$ is disposed in the first pixel regions P10, a second alignment protrusion structure 222$g$ is disposed in the second pixel regions P20, and a third alignment protrusion structure 222$b$ is disposed in the third pixel regions P30. The first alignment protrusion structure 222r, the second alignment protrusion structure 222g and the third alignment protrusion structure 222b have different heights.

In the present invention, the height of the first alignment protrusion structure 222r is smaller than that of the second alignment protrusion structure 222g, and the height of the second alignment protrusion structure 222g is smaller than that of the third alignment protrusion structure 222b. Since the different heights of the alignment protrusion structures 222r, 222g, and 222b in the pixel regions P10, P20, and P30 can affect the liquid crystal molecules in the liquid crystal layer 230 to arranged into different tilt angles, a white light will have a various wavelength-brightness distribution after passing through the liquid crystal layer 230 in each of the pixel regions P10, P20, and P30. Generally, the first substrate 210 or the second substrate 220 may has a red filtering pattern R20, a green filtering pattern G20, and a blue filtering pattern B20 disposed thereon in order to perform a full color display. Certainly, other color filtering pattern can be adopted too. Since the red, green, and blue filtering patterns R20, G20, and B20 have different transmittances, an appropriate wavelength distribution corresponding to the transmittances of the red, green, and blue filtering patterns R20, G20, and B20 is attained to thereby produce a red light, a green light, and a blue light with uniform brightness after the white light passes through the pixel regions P10, P20, and P30. Therefore, the color uniformity of the LCD panel can be improved.

In addition, the first substrate 210 or the second substrate 220 may be an active device array, such as a TFT array. In other words, the first substrate 210 or the second substrate 220 may have a plurality of active devices, such as TFT, formed thereon. The materials of the alignment protrusion structure 222r, 222g and 222b are selected from the group consisting of a color filtering material and a transparent photo-sensitive material.

It should be noted that the height relationship of the alignment protrusion structures 222r, 222g, and 222b in the aforementioned embodiment is just an example and can be adjusted according to characteristics of the red, green, and blue filtering patterns R20, G20, and B20. Moreover, the brightness distribution of the red, green, and blue lights is not limited to uniform and can be adjusted by modifying the heights of the alignment protrusion structures 222r, 222g, and 222b according to necessary of design. In other words, the present invention can adjust the brightness distribution in different wavelength after the white light passes through the liquid crystal layer by modifying the heights of the alignment protrusion structure.

The following provides an example for illustrating a method of modifying the height of the alignment protrusion structure in different pixel regions.

FIGS. 5A to 5F are cross-sectional views illustrating a method for fabricating a color filter substrate according to an embodiment of the present invention. First, referring to FIG. 5A, a substrate 310 is provided, wherein the substrate 310 may be a glass substrate. In addition, the substrate 310 has a plurality of first pixel regions P40, a plurality of second pixel regions P50, and a plurality of third pixel regions P60 defined thereon, and the FIGS. 5A to 5F show only a first pixel region P40, a second pixel region P50 and a third pixel region P60. The pixel regions P40, P50, and P60 may be defined by a patterned light shielding layer 320, such as a black matrix, formed on the transparent substrate 310.

Then, referring to FIGS. 5B to 5E, color filtering patterns R30, G30, and B30 are formed respectively in the pixel regions P40, P50, and P60 on the substrate 310. A protrusion pattern 342R is formed on the color filtering pattern R30 in each pixel region P40. In each pixel region P50, a lower layer filtering pattern 344G is formed under the color filtering pattern G30 and a protrusion pattern 342G is formed on the color filtering pattern G30. In each pixel region P60, a double layer filtering pattern constituted of a first filtering pattern 346B and a second filtering pattern 344B is formed under the color filtering pattern B30 and a protrusion pattern 342B is formed on the color filtering pattern B30.

Figure 5A:
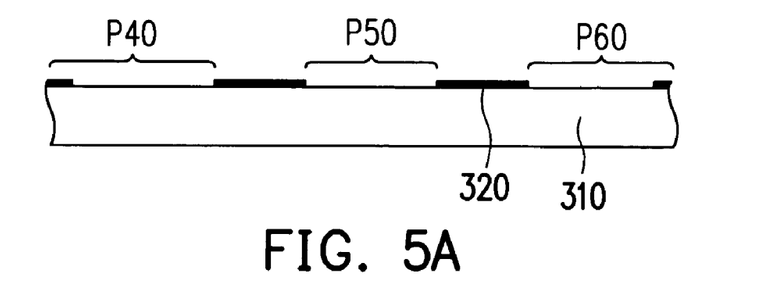
FIGS. 5A to 5F are cross-sectional views illustrating a method for fabricating a color filter substrate according to an embodiment of the present invention.
Figure 5B:
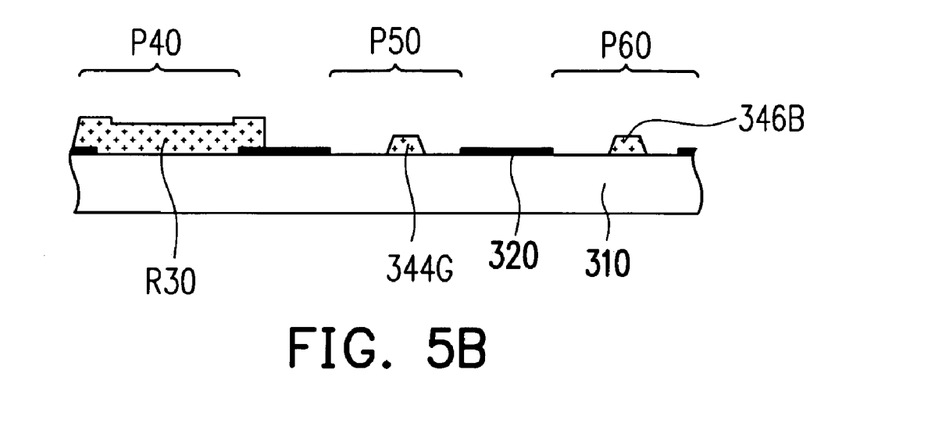
Figure 5C:
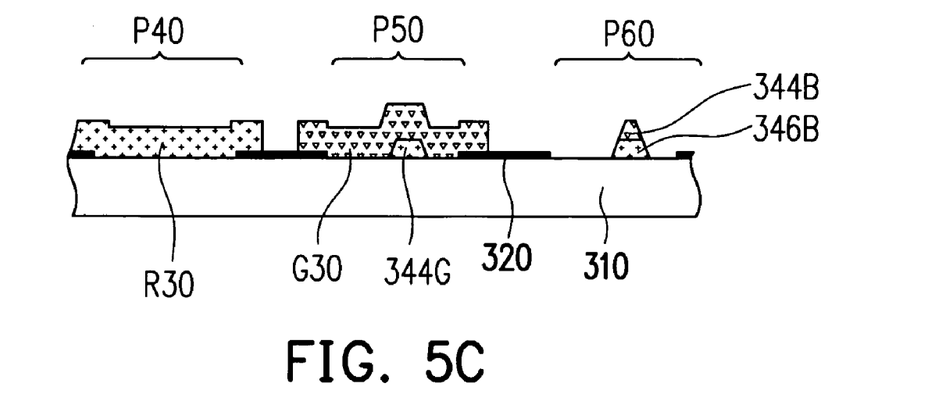
Figure 5D:
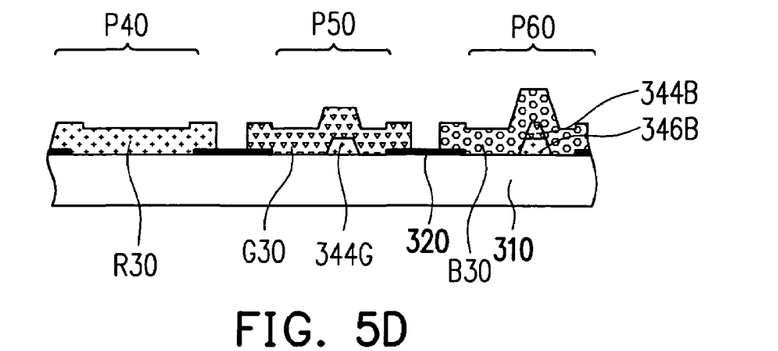

Specifically, referring to FIG. 5B, the color filtering pattern R30 is formed on the whole of each pixel region P40 of the substrate 310. And, the lower layer filtering 1o pattern 344G is formed on a portion of each pixel region P50 and the first filtering pattern 346B is formed on a portion of each pixel region P60. Then, referring to FIG. 5C, the color filtering pattern G30 is formed on the whole of each pixel region P50 of the substrate 310. And, the second filtering pattern 344B is formed on a portion of each pixel region P60. Thereafter, referring to FIG. 5D, the color filtering pattern B30 is formed on the whole of each pixel region P60 of the substrate 310. By the above manner, stacked structures having different heights can be produced in each pixel regions P40, P50 and P60.

Figure 5E:
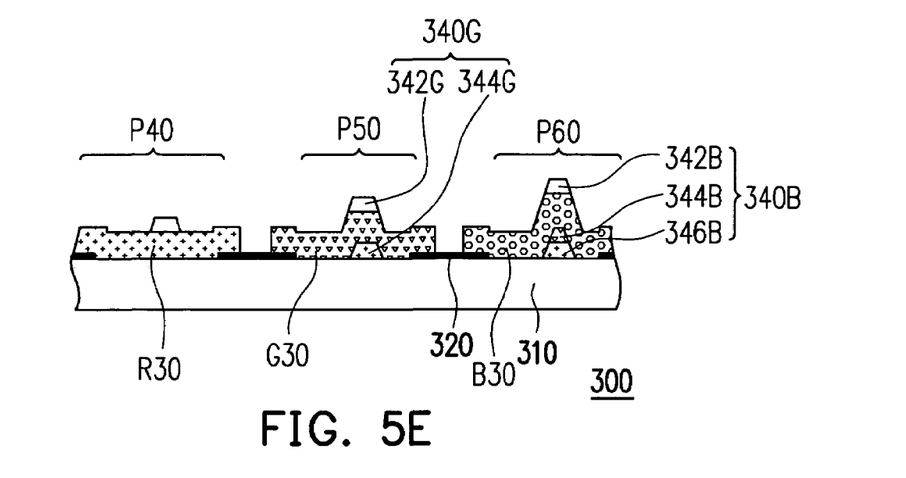

Then, referring to FIG. 5E, protrusion patterns 342R, 342G and 342B are selectively formed on the color filtering patterns R30, G30, and B30. The protrusion pattern 342G is formed on the lower layer filtering pattern 344G, and the protrusion pattern 342B is formed on the second filtering pattern 344B. In the embodiment, the protrusion pattern 342R constitutes an alignment protrusion structure 340R, the protrusion pattern 342G and the lower layer filtering pattern 344G constitute an alignment protrusion structure 340G, and the protrusion pattern 342B, the first filtering pattern 346B and the second filtering pattern 344B constitute an alignment protrusion structure 340B. The heights of the alignment protrusion structures 340R, 340G and 340B are different.

Up to present, the fabricating of the color filter substrate 300 is almost completed. A LCD panel having superior color uniformity as that shown in FIG. 4 can therefore be provided after assembling the color filter substrate 300 with another substrate and forming a liquid crystal layer between the color filter substrate 300 and the other substrate.

Figure 5F:
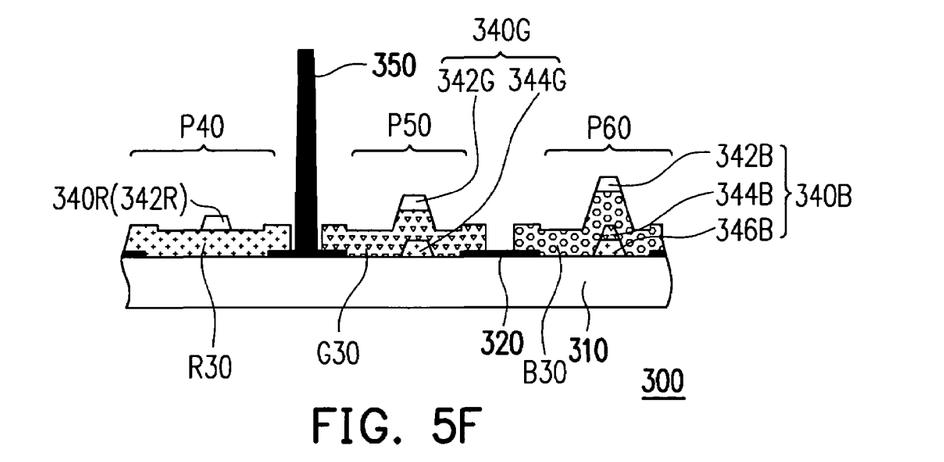

In addition, referring to FIG. 5F, there can further be plural spacers 350 formed on the color filter substrate 300 to maintain a cell gap between the color filter substrate 300 and an opposed substrate. Moreover, the spacers 350 are preferably formed over the patterned light shielding layer 320 for preserving the aperture ratio.

Figure 6:
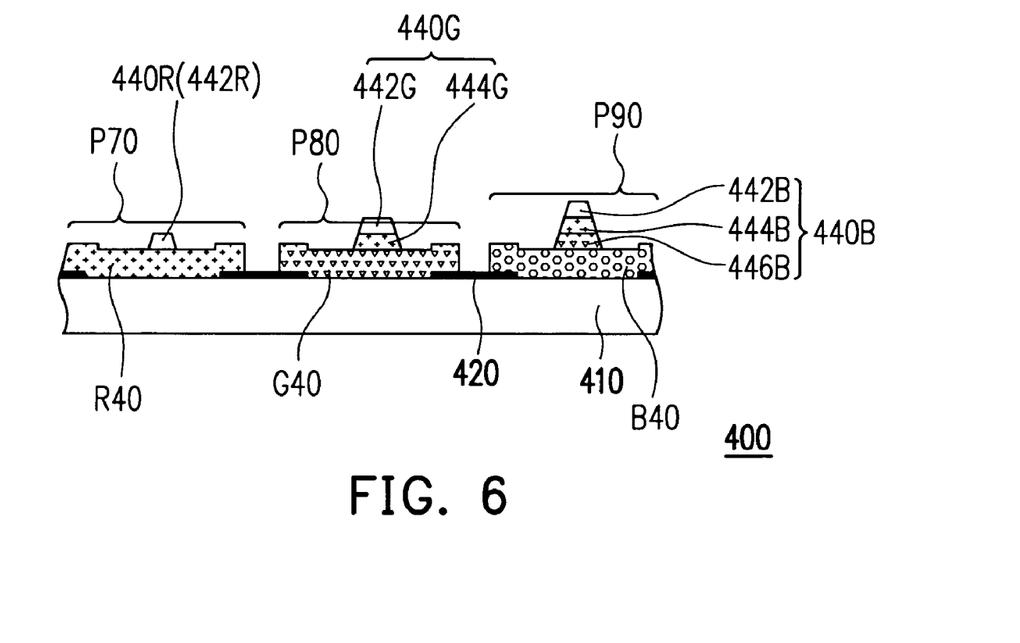
FIG. 6 is a cross-sectional view illustrating a color filter substrate according to another embodiment of the present invention.

Another method of modifying the height of the alignment protrusion structure in different sub-pixel regions will be illustrated by an example in the following paragraph. FIG. 6 is a cross-sectional view illustrating a color filter substrate according to another embodiment of the present invention. First, a color filtering pattern B40 is formed on the whole of each pixel region P90 of a transparent substrate 410. Then, a color filtering pattern G40 is formed on the whole of each pixel region P80 of the transparent substrate 410, and a first filtering pattern 446B is formed on a portion of each pixel region P90. Next, a color filtering pattern R40 is formed on the whole of each pixel region P70, and a lower layer filtering pattern 444G and a second filtering pattern 444B are formed on a portion of each pixel region P80 and P90 respectively. Thereafter, protrusion patterns 442R, 442G and 442B are selectively formed on the color filtering patterns R40, G40, and B40. The protrusion pattern 442R constitutes an alignment protrusion structure 440R, the protrusion pattern 442G and the lower layer filtering pattern 444G constitute an alignment protrusion structure 440G, and the protrusion pattern 442B, the first filtering pattern 446B and the second filtering pattern 444B constitute an alignment protrusion structure 440B. By a fabricating method different from that of FIG. 5A to 5E, the alignment protrusion structures 440R, 440G and 440B with different heights are still attained.

It should be noted that although the fabricating methods mentioned above form the alignment protrusion structure having different heights in pixel regions by stacking the color filtering patterns, there should by no means limit the scope of the present invention. Moreover, in the LCD panel of the present invention, the alignment protrusion structure is not limited to be formed on a same substrate with the color filtering patterns. In addition, the alignment protrusion structure can further be formed on both substrates of the LCD panel, wherein the color uniformity of the LCD panel can be improved by modifying the height of the alignment protrusion structure in different pixel regions on at least one of the substrates.

A LCD panel according to another embodiment of the present invention will be illustrated in the following paragraph.

Figure 7:
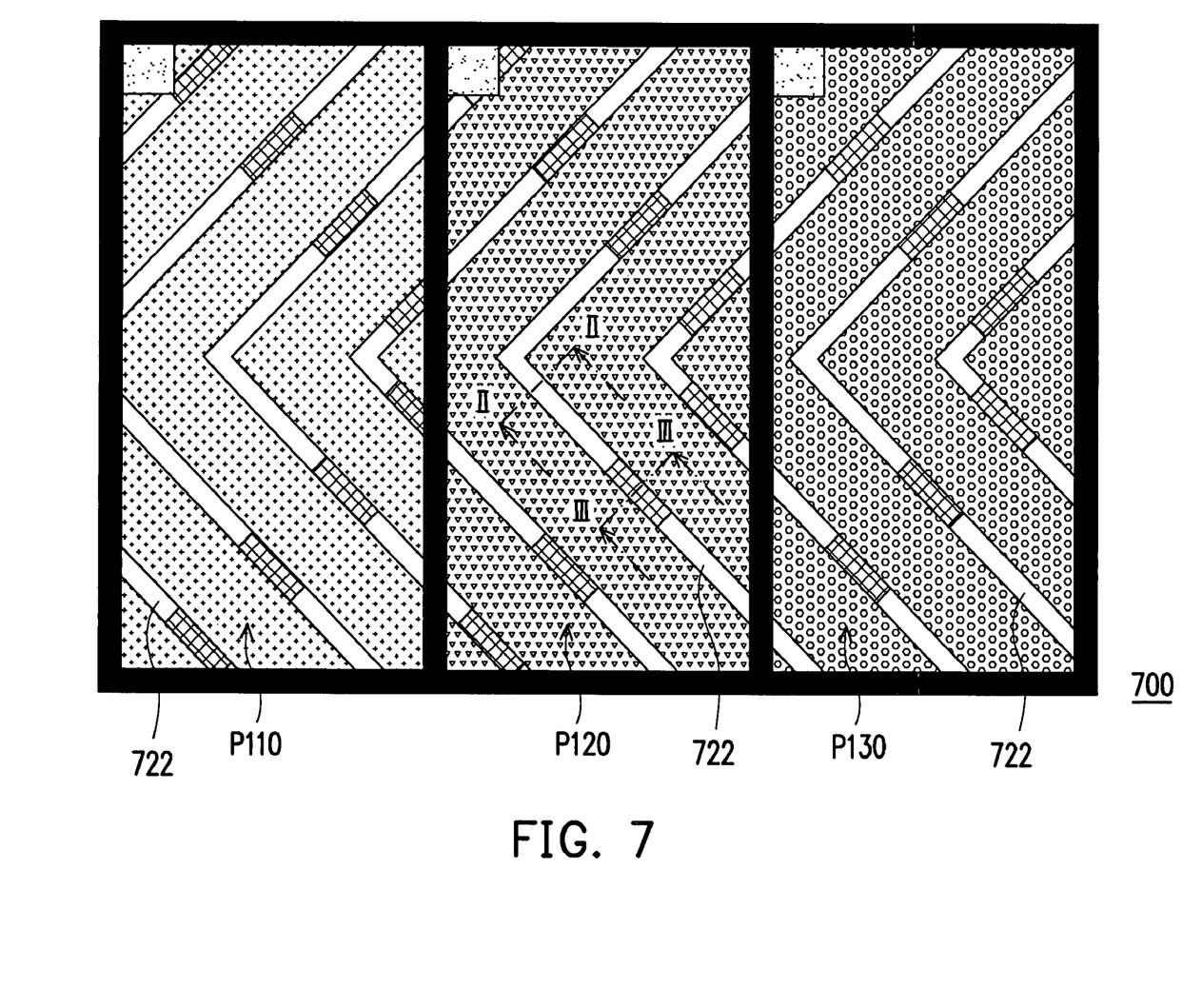
FIG. 7 is a top view illustrating a pixel of the LCD panel according to another embodiment of the present invention.
Figure 8A:
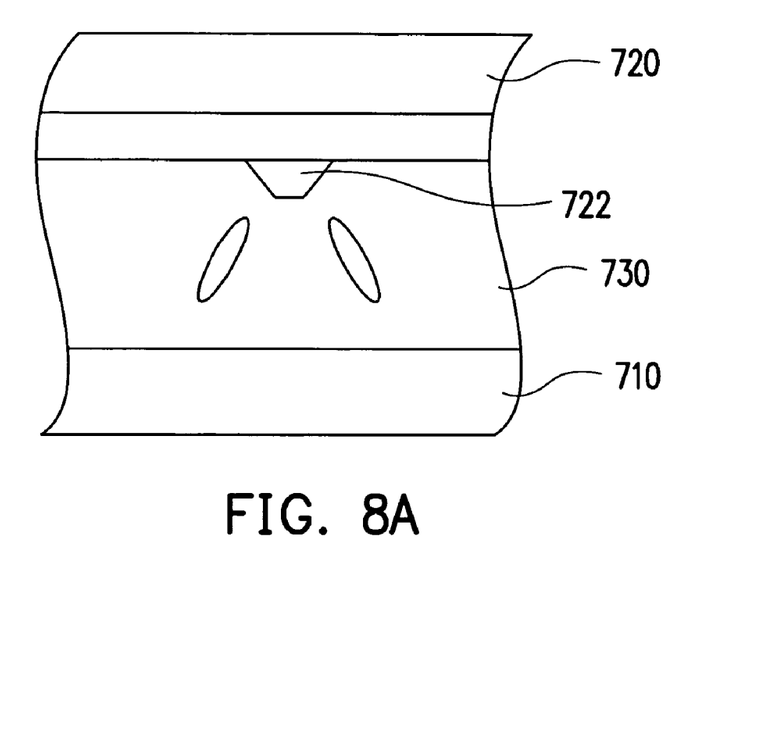
FIGS. 8A and 8B are cross-sectional views along line II-II and line III-III in FIG. 7.
Figure 8B:
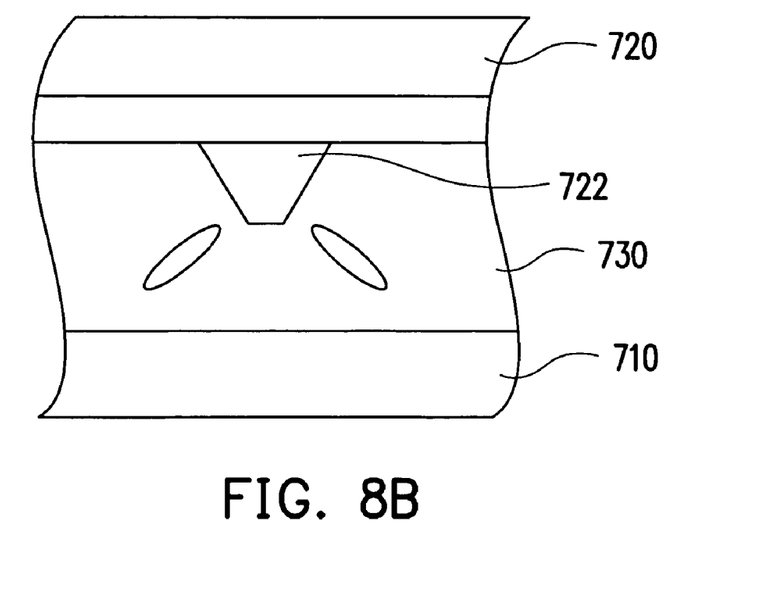

FIG. 7 is a top view illustrating a pixel of the LCD panel according to another embodiment of the present invention. FIGS. 8A and 8B are cross-sectional views along line II-II and line III-III in FIG. 7. Referring to FIGS. 7, 8A, and 8B, differences between the LCD panel 500 in the present embodiment and the LCD panel 200 in FIG. 3 include: the alignment protrusion structure 722 having various heights in each pixel region P110, P120, and P130. Referring to FIGS. 8A and 8B, since the alignment protrusion structure 722 in each pixel region P110, P120, and P130 has different heights at different positions, the liquid crystal molecules in the liquid crystal layer 730 can have different tilt angles at the positions shown in FIGS. 8A and 8B. In other words, the liquid crystal molecules can be arranged in more domains by the height difference of the alignment protrusion structure 722 in each pixel region P110, P120, and P130. Therefore, the problem of gamma shift can be reduced as observing the LCD panel 500 in different visions.

The alignment protrusion structure 722 can be formed by adopting the fabricating method illustrated in FIG. 5A to 5F, and the alignment protrusion structure 722 in different positions in each pixel region P110, P120 or P130 can be formed by stacking various amounts of the protrusion patterns and the filtering patterns.

The LCD panel of the present invention includes the following features. One is that the alignment protrusion structure has different heights in different sub-pixel regions of each pixel region. The other is that the alignment protrusion structure has different heights at different position in a same sub-pixel region. The two feathers can be applied to a LCD panel independently or cooperatively. A feature of the method for fabricating the color filter substrate of the present invention is modifying the height of the alignment protrusion structure by changing the stacked number of the color filtering patterns.

In summary, according to the LCD panel and the method for fabricating the color filter substrate of the present invention, the alignment protrusion structure may have different heights in different pixel regions of each pixel region, and thus the liquid crystal molecules in different pixel regions have different tilt angles for improving the color uniformity of the LCD panel. Furthermore, as the alignment protrusion structure has different heights in different positions in a pixel region, the liquid crystal molecules in each pixel region have different tilt angles for reducing the problem of gamma shift.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
a first substrate;
a second substrate, wherein a plurality of first pixel regions, a plurality of second pixel regions, and a plurality of third pixel regions are defined on the second substrate, a first alignment protrusion structure is disposed in the first pixel regions, a second alignment protrusion structure is disposed in the second pixel regions, a third alignment protrusion structure is disposed in the third pixel regions, and the first alignment protrusion structure, the second alignment protrusion structure and the third alignment protrusion structure have different heights; and
a liquid crystal layer disposed between the first substrate and the second substrate;
wherein the material of at least one of the first alignment protrusion structure, the second alignment protrusion structure and the third alignment protrusion structure consists of a color filtering material and a transparent photo-sensitive material.

2. The liquid crystal display panel according to claim 1, wherein the height of the first alignment protrusion structure in each first pixel region is various as well as the second alignment protrusion structure in each second pixel region and the third alignment protrusion structure in each third pixel region.

3. The liquid crystal display panel according to claim 1, wherein a first color filtering pattern is disposed in the first pixel regions and the first alignment protrusion structure is disposed on the first color filtering pattern, a second color filtering pattern is disposed in the second pixel regions and the second alignment protrusion structure is disposed on the second color filtering pattern, and a third color filtering pattern is disposed in the third pixel regions and the third alignment protrusion structure is disposed on the third color filtering pattern.

4. The liquid crystal display panel according to claim 3, wherein the first alignment protrusion structure consists of a protrusion pattern, the second alignment protrusion structure consists of a lower layer filtering pattern and a first upper layer protrusion pattern, and the third alignment protrusion structure consists of a double layer filtering pattern and a second upper layer protrusion pattern.

5. The liquid crystal display panel according to claim 1, wherein a first color filtering pattern is disposed in the first pixel regions, a second color filtering pattern is disposed in the second pixel regions, and a third color filtering pattern is disposed in the third pixel regions, the first alignment protrusion structure consisting of a protrusion pattern disposed on the first color filtering pattern, the second alignment protrusion structure consisting of a lower layer filtering pattern disposed under the second color filtering pattern and a first upper layer protrusion pattern disposed on the second color filtering pattern, the third alignment protrusion structure consisting of a double layer filtering pattern disposed under the third color filtering pattern and a second upper layer protrusion pattern disposed on the third color filtering pattern.

6. The liquid crystal display panel according to claim 1, further comprising a plurality of spacers disposed between the first substrate and the second substrate.

7. The liquid crystal display panel according to claim 1, wherein the first substrate is a thin film transistor array substrate.

8. A liquid crystal display panel, comprising:
a first substrate;
a second substrate, disposed above the first substrate, wherein a plurality of pixel regions is defined on the second substrate, an alignment protrusion structure is disposed in the pixel regions, and the height of the alignment protrusion structure in each first pixel region is various; and
a liquid crystal layer disposed between the first substrate and the second substrate.

9. The liquid crystal display panel according to claim 8, wherein the material of the alignment protrusion structure is selected from the group consisting of a color filtering material and a transparent photo-sensitive material.

10. The liquid crystal display panel according to claim 8, further comprising a plurality of spacers disposed between the first substrate and the second substrate.

11. The liquid crystal display panel according to claim 8, wherein the first substrate is a thin film transistor array substrate and the second substrate is a color filter substrate.

12. A method for fabricating a color filter substrate, comprising:
providing a substrate having a plurality of first pixel regions, a plurality of second pixel regions, and a plurality of third pixel regions;
forming a first color filtering pattern in each first pixel region, a second color filtering pattern in each second pixel region, and a third color filtering pattern in each third pixel region respectively;
forming a first alignment protrusion pattern on the first color filtering pattern in each first pixel region;
forming a second alignment protrusion pattern on the second color filtering pattern in each second pixel region; and
forming a third alignment protrusion pattern on the third color filtering pattern in each third pixel region, wherein the first alignment protrusion structure, the second alignment protrusion structure and the third alignment protrusion structure have different heights; the material of at least one of the first alignment protrusion structure, the second alignment protrusion structure and the third alignment protrusion structure consists of a color filtering material and a transparent photo-sensitive material.

13. The method for fabricating the color filter substrate according to claim 12, wherein the method for forming the first alignment protrusion structure, the second alignment protrusion structure and the third alignment protrusion structure comprises:
forming a first filtering pattern on the third color filtering pattern in each third pixel region while forming the second color filtering pattern in each second pixel;
forming a lower layer filtering pattern on the second color filtering pattern in each second pixel region and forming a second filtering pattern on the first filtering pattern on the third color filtering pattern while forming the first color filtering pattern in each first pixel region; and
forming a protrusion pattern on each first color filtering pattern, on the lower filtering pattern, and on the second filtering pattern.

14. The method for fabricating the color filter substrate according to claim 12, further comprising forming a patterned light shielding layer before forming the first color filtering pattern, the second color filtering pattern, and the third color filtering pattern.

15. A method for fabricating a color filter substrate, comprising:
providing a substrate having a plurality of first pixel regions, a plurality of second pixel regions, and a plurality of third pixel regions;
forming a first color filtering pattern in each first pixel region, a second color filtering pattern in each second pixel region, and a third color filtering pattern in each third pixel region respectively;
forming a protrusion pattern on the first color filtering pattern in each first pixel region;
forming a lower layer filtering pattern under the second color filtering pattern and forming a first upper layer protrusion pattern on the second color filtering pattern in each second pixel region; and
forming a double layer filtering pattern under the third color filtering pattern and forming a second upper layer protrusion pattern on the third color filtering pattern in each third pixel region.

16. The method for fabricating the color filter substrate according to claim 15, wherein the materials of the protrusion pattern formed on the first color filtering pattern, the first upper layer protrusion pattern formed on the second color filtering pattern, and the second upper layer protrusion pattern the third color filtering pattern comprise a transparent photo-sensitive material.

17. The method for fabricating the color filter substrate according to claim 15, wherein the lower layer filtering pattern is formed in each second pixel region and a first filtering pattern is formed in each third pixel region while forming the first color filtering pattern in each first pixel region.

18. The method for fabricating the color filter substrate according to claim 15, wherein a second filtering pattern is formed on the first filtering pattern to constitute the double layer filtering pattern with the first filtering pattern in each third pixel region while forming the second color filtering pattern in each second pixel region.

* * * * *